United States Patent
Sugita et al.

(10) Patent No.: US 10,451,496 B2
(45) Date of Patent: Oct. 22, 2019

(54) PRESSURE-SENSITIVE SENSOR

(71) Applicant: Hitachi Metals, Ltd., Tokyo (JP)

(72) Inventors: Keisuke Sugita, Tokyo (JP); Akinari Nakayama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 7 days.

(21) Appl. No.: 15/841,414

(22) Filed: Dec. 14, 2017

(65) Prior Publication Data

US 2018/0180495 A1 Jun. 28, 2018

(30) Foreign Application Priority Data

Dec. 28, 2016 (JP) ................................ 2016-256304
Nov. 9, 2017 (JP) ................................ 2017-216009

(51) Int. Cl.
*G01L 1/22* (2006.01)
*B32B 27/08* (2006.01)
*B32B 1/00* (2006.01)
*H01B 3/28* (2006.01)
*H01B 3/30* (2006.01)
(Continued)

(52) U.S. Cl.
CPC .............. *G01L 1/2281* (2013.01); *B32B 1/00* (2013.01); *B32B 1/08* (2013.01); *B32B 27/08* (2013.01); *B32B 27/28* (2013.01); *B32B 27/285* (2013.01); *B32B 27/302* (2013.01); *B32B 27/40* (2013.01); *G01L 1/2287* (2013.01); *H01B 3/28* (2013.01);
(Continued)

(58) Field of Classification Search
CPC ... G01L 1/2281; G01L 1/2287; B32B 27/285; B32B 27/28; B32B 27/302; B32B 27/40; B32B 27/08; B32B 1/08; B32B 1/00; B32B 2307/206; H01B 3/302
See application file for complete search history.

(56) References Cited

U.S. PATENT DOCUMENTS 6,078,014 A * 6/2000 Kashiwazaki ......... H01B 7/104
   200/508
2011/0185819 A1 8/2011 Hattori et al.
(Continued)

FOREIGN PATENT DOCUMENTS

JP 2011-158336 A 8/2011
JP 2012-119309 A 6/2012

*Primary Examiner* — Nathaniel T Woodward
(74) *Attorney, Agent, or Firm* — McGinn I.P. Law Group PLLC.

(57) ABSTRACT

A pressure-sensitive sensor includes a long hollow insulation that is elastically deformable and includes a hollow portion extending continuously in a longitudinal direction, a plurality of electrode wires that are provided along the inner peripheral surface of the hollow portion throughout the longitudinal length and are arranged facing each other with a distance therebetween so as to come into contact with each other when bent with elastic deformation of the hollow insulation, each electrode wire being formed by providing a conductive cover around a conductor, and an outer layer formed to cover an outer surface of the hollow insulation. The hollow insulation includes an insulating composition (A) including a styrene-based thermoplastic elastomer (a1). The outer layer including an insulating composition (C) including a thermoplastic polyurethane (c1) and an acid-modified polymer (c2) that is modified with an unsaturated carboxylic acid or a derivative thereof.

22 Claims, 3 Drawing Sheets

(51) Int. Cl.
*B32B 27/40* (2006.01)
*B32B 27/28* (2006.01)
*B32B 27/30* (2006.01)
*B32B 1/08* (2006.01)

(52) U.S. Cl.
CPC ........ *H01B 3/302* (2013.01); *B32B 2307/206* (2013.01)

(56) References Cited

U.S. PATENT DOCUMENTS

| | | | |
|---|---|---|---|
| 2011/0232391 A1* | 9/2011 | Ruby, III | G01L 5/0057 73/768 |
| 2012/0111125 A1 | 5/2012 | Oyama et al. | |
| 2013/0029070 A1* | 1/2013 | Ikeda | C07C 233/38 428/35.7 |

* cited by examiner

PRESSURE-SENSITIVE SENSOR

The present application is based on Japanese patent application Nos. 2016-256304 and 2017-216009 filed on Dec. 28, 2016 and Nov. 9, 2017, the entire contents of which are incorporated herein by reference.

BACKGROUND OF THE INVENTION

1. Field of the Invention

The invention relates to a pressure-sensitive sensor.

2. Description of the Related Art

Automatic opening and closing devices are installed on, e.g., vehicles to electrically move doors. Such automatic opening and closing devices are configured to be able to mount a pressure-sensitive sensor to detect pinching or contact of foreign object or human body at an openable portion of vehicle such as between a rim of entrance and a door panel (see, e.g., JP 2011/158336A).

In general, pressure-sensitive sensor is composed of a long hollow insulation with a hollow portion extending continuously in a longitudinal direction, and plural electrode wires which are arranged inside the hollow portion so as to face each other with a distance therebetween and come into contact with each other when the hollow insulation is elastically deformed. Each electrode wire is formed by covering a conductor with a conductive cover formed of a conductive resin composition. The pressure-sensitive sensor is configured that when the hollow insulation is elastically deformed due to external pressure caused by contact with a foreign object, the electrode wires inside the hollow portion comes into contact with each other and this contact causes a change in resistance value based on which contact of the foreign object is detected.

Since the hollow insulation and the conductive covers of the electrode wires are required to have flexibility and resilience to return from elastic deformation so that the pressure-sensitive sensor can have a desired sensitivity, a rubber composition is generally used as a material to form such members. The rubber composition is formed using a rubber component, e.g., ethylene-propylene-diene copolymer or silicone rubber, etc., as a base to which, when imparting conductivity, a conductivity agent such as carbon black is mixed.

The hollow insulation and the conductive covers, when formed of a rubber composition, are subjected to post-molding crosslinking to obtain a desired elasticity. The crosslinking is performed using heated air, hot press, or high-pressure water vapor, etc. In this regard, however, if the crosslinking process is performed separately from the molding of the rubber composition, the number of manufacturing steps increases. Even if the molding and the crosslinking are performed in the same line, it takes time to cross-link. In any case, the manufacturing cost may increase.

Thus, in place of the rubber component, the use of an elastomer component not requiring post-molding crosslinking has been proposed. For example, the use of a styrene-based thermoplastic elastomer has been proposed (see, e.g., JP 2012/119309A).

SUMMARY OF THE INVENTION

In the known pressure-sensitive sensor, an outer layer as a protective member is provided around the hollow insulation. The outer layer is required not only to have properties as protective member but also flexibility and resilience to return from elastic deformation in the same manner as the hollow insulation and the conductive cover. Thus, a thermoplastic urethane which is also excellent in mechanical characteristics may be proposed as a material to form an outer layer.

However, if the outer layer is formed of a composition containing thermoplastic urethane, the outer layer may not have sufficient adhesion to the hollow insulation formed of a composition containing styrene-based thermoplastic elastomer. Both ends of pressure-sensitive sensor may be sealed with a resin to enhance waterproofing inside the sensor. In this case, if adhesion between the hollow insulation and the outer layer is not sufficient, the injected resin may enter therebetween at the interface, causing poor outer appearance and dimensional error.

It is an object of the invention to provide a pressure-sensitive sensor that is excellent in adhesion between the hollow insulation and the outer layer.

According to an embodiment of the invention, a pressure-sensitive sensor comprises:

a long hollow insulation that is elastically deformable and comprises a hollow portion extending continuously in a longitudinal direction;

a plurality of electrode wires that are provided along the inner peripheral surface of the hollow portion throughout the longitudinal length and are arranged facing each other with a distance therebetween so as to come into contact with each other when bent with elastic deformation of the hollow insulation, each electrode wire being formed by providing a conductive cover around a conductor; and an outer layer formed to cover an outer surface of the hollow insulation, wherein the hollow insulation comprises an insulating composition (A) comprising a styrene-based thermoplastic elastomer (a1), and wherein the outer layer comprises an insulating composition (C) comprising a thermoplastic polyurethane (c1) and an acid-modified polymer (c2) that is modified with an unsaturated carboxylic acid or a derivative thereof.

Effects of the Invention

According to an embodiment of the invention, a pressure-sensitive sensor can be provided that is excellent in adhesion between the hollow insulation and the outer layer.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment of the Invention

Figure 1A:
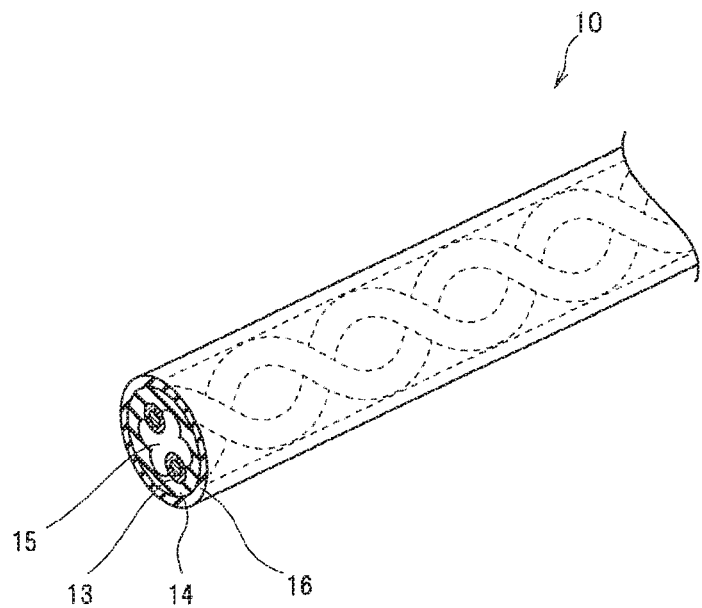
FIG. 1A is a schematic perspective view showing a configuration of a pressure-sensitive sensor in an embodiment of the present invention and FIG. 1B is a cross sectional view showing the pressure-sensitive sensor taken perpendicular to the longitudinal direction thereof.
Figure 1B:
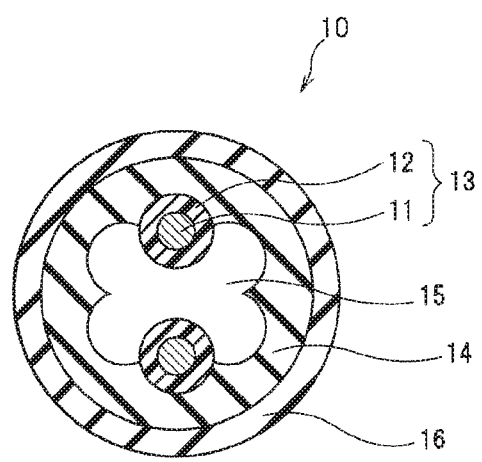
Figure 2:
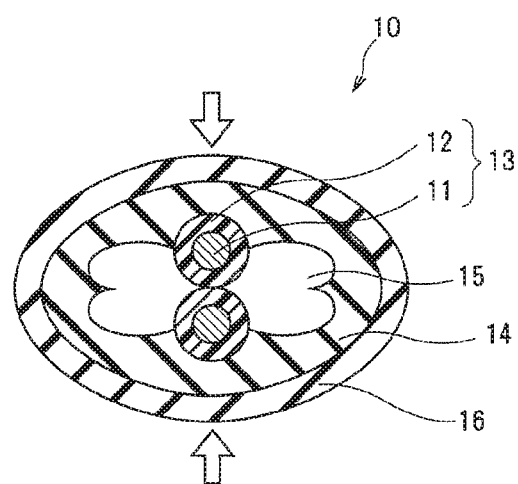
FIG. 2 is a cross sectional view showing the pressure-sensitive sensor deformed due to an external pressure.

A pressure-sensitive sensor in an embodiment of the invention will be described below in conjunction with the drawings. FIG. 1A is a schematic perspective view showing a configuration of a pressure-sensitive sensor in an embodiment of the invention and FIG. 1B is a cross sectional view showing the pressure-sensitive sensor taken perpendicular to the longitudinal direction thereof. FIG. 2 is a cross sectional view showing the pressure-sensitive sensor deformed due to an external pressure. Hereinafter, the numerical ranges expressed using "-" include the numerical values before and after "-" as the lower and upper limits.

General Configuration of the Pressure-Sensitive Sensor

As shown in FIGS. 1A and 1B, a pressure-sensitive sensor 10 in the present embodiment is a long cable-shaped sensor composed of a long hollow insulation 14, plural electrode wires 13 each formed by providing a conductive cover 12 around a conductor 11, and an outer layer 16 formed to cover an outer surface of the hollow insulation 14. The hollow insulation 14 is elastically deformable and has a hollow portion 15 extending continuously in a longitudinal direction. The electrode wires 13 are provided along the inner peripheral surface of the hollow portion 15 throughout the longitudinal length and arranged facing each other with a distance therebetween so as to come into contact with each other when bent with elastic deformation of the hollow insulation 14.

Since the hollow insulation 14 is formed of an insulating composition (A) (described later) and has a substantially cylindrical shape by having the hollow portion 15 extending continuously in the longitudinal direction, the hollow insulation 14 can elastically deform when an external pressure is applied to the pressure-sensitive sensor 10.

The shape and thickness of the hollow insulation 14 are not specifically limited as long as the hollow insulation 14 has the hollow portion 15. The hollow portion 15 can have any size as long as the plural electrode wires 13 can be housed without contact with each other, and the size of the hollow portion 15 can be appropriately changed according to the number of the electrode wires 13.

A pair of electrode wires 13 are arranged on the inner peripheral surface of the hollow portion 15 of the hollow insulation 14 and are held by the hollow insulation 14. The pair of electrode wires 13 are arranged facing each other with a distance therebetween and without contact with each other inside the hollow portion 15. In addition, in the present embodiment, the pair of electrode wires 13 are spirally wound along the inner peripheral surface of the hollow portion 15 throughout the longitudinal length as shown in FIG. 1A and are arranged to face each other at any longitudinal position of the pressure-sensitive sensor 10.

As shown in FIG. 1B, each electrode wire 13 is provided with the conductor 11 and the conductive cover 12 formed of a conductive composition (B) (described later).

As the conductor 11, it is possible to use a commonly-used metal wire, e.g., a copper wire, a soft copper wire, a copper alloy wire, an aluminum wire, a gold wire or a silver wire, etc. Alternatively, a metal wire of which outer surface is plated with a metal such as tin, nickel, silver or gold may be used to improve heat resistance. Furthermore, it is also possible to use a bunch-stranded conductor formed by twisting metal wires together. The outer diameter of the conductor 11 is not specifically limited and is appropriately changed according to electrical characteristics required for the electrode wire 13.

The conductive cover 12 is provided around the conductor 11. The conductive cover 12 is formed of the conductive composition (B) (described later) and conducts electricity when the electrode wires 13 are bent with deformation of the hollow insulation 14 caused by an external pressure and come into contact with each other. The thickness of the conductive cover 12 is appropriately changed according to conductivity and flexibility required for the electrode wire 13.

The outer layer 16 is provided around the hollow insulation 14. The outer layer 16 is formed of an insulating composition (C) (described later), and covers and protects the hollow insulation 14. The thickness of the outer layer 16 is a thickness which allows flexibility to be maintained while covering and protecting the hollow insulation 14.

The pressure-sensitive sensor 10 is configured that, e.g., two electrode wires 13 are led out from both ends, are connected to each other at one end via a resistor and are connected to a power feeding portion (not shown) at the other end, and an electric current is supplied to the electrode wires 13. In the state in which an external pressure is not applied to the pressure-sensitive sensor 10 as shown in FIG. 1B, an electric current is supplied to one of the electrode wires 13 from the power feeding portion, passes through the resistor and then flows through the other electrode wire 13. Meanwhile, when an external pressure is applied to the pressure-sensitive sensor 10 as shown in FIG. 2, the hollow insulation 14 is elastically deformed at a portion receiving the external pressure and the electrode wires 13 in the hollow portion 15 are bent with deformation and come into contact with each other, causing that the electric current also flows through the contact portion. This causes a change in resistance value and, when the power feeding portion is supplying an electric current at a constant voltage, the current value changes. The external pressure applied to the pressure-sensitive sensor 10 is detected by detecting the change in the current value.

Material for Forming Respective Member

Next, materials for forming the hollow insulation 14, the conductive cover 12, the electrode wire 13 and the outer layer 16, which constitute the pressure-sensitive sensor 10, will be described.

Material for Forming the Hollow Insulation

As described above, to eliminate a process of crosslinking the hollow insulation 14, an elastomer composition not requiring crosslinking is used to form the hollow insulation 14 in the present embodiment, instead of using a rubber composition requiring crosslinking. The insulating composition (A) containing a styrene-based thermoplastic elastomer (a1) is used as the elastomer composition in view of mechanical characteristics, heat resistance, flexibility and resilience to return from elastic deformation (compression resistance).

The styrene-based thermoplastic elastomer (a1) (hereinafter, also simply referred to as "component (a1)") is a block copolymer or random copolymer which has a polymer block as a hard segment formed of styrene-based monomer (e.g., polystyrene) and a polymer block as a soft segment formed of olefin. In detail, it is possible to use, e.g., styrene-butadiene-styrene block copolymer (SBS), styrene-isoprene-styrene block copolymer (SIS) and styrene-isoprene-butadiene-styrene block copolymer (SIBS), or those obtained by hydrogenating thereof such as styrene-ethylene-butylene-styrene block copolymer (SEBS), styrene-ethylene-propylene-styrene block copolymer (SEPS) and styrene-ethylene-ethylene-propylene-styrene block copolymer (SEEPS), etc., which may be used alone or in combination of two or more.

The styrene-based thermoplastic elastomer (a1) with less unsaturated bonds in the molecular chain has higher heat resistance. Thus, the styrene-based thermoplastic elastomer (a1), which is hydrogenated and thus does not have double bond in the molecular chain, is preferable in view of improving heat resistance of the hollow insulation 14. In particular, SEBS, SEPS and SEEPS, etc., are preferable.

In view of enhancing operability of the pressure-sensitive sensor 10 in a high-temperature environment (high-temperature operability), the styrene-based thermoplastic elastomer (a1) is preferably capable of returning to the original shape even after the hollow insulation 14 is repeatedly deformed in a high-temperature environment, and the styrene-based thermoplastic elastomer (a1) preferably has a compression set at 70° C. of not more than 30%. If the compression set is large, the hollow insulation 14 may not restore to the original state after repeated deformation and the electrode wires 13 remain in contact with each other, resulting in that the pressure-sensitive sensor 10 does not operate properly. However, when the compression set is not more than 30%, the pressure-sensitive sensor 10 can maintain a high level of high-temperature operability. The compression set at 70° C. here is as measured in accordance with JIS K6262.

The styrene content and molecular weight of the styrene-based thermoplastic elastomer (a1) are not specifically limited.

The insulating composition (A) may also contain a rubber component or a crystalline resin, etc., in addition to the styrene-based thermoplastic elastomer (a1).

In addition, the insulating composition (A) may also contain, if required, other additives such as processing aid, oil, flame retardant, flame-retardant aid, crosslinking aid, ultraviolet absorber, antioxidant, copper inhibitor, lubricant, filler, compatibilizing agent, stabilizer and colorant, etc.

Material for Forming the Conductive Cover

The conductive cover 12 is required to have adhesion strong enough to prevent separation from the hollow insulation 14 even after the hollow insulation 14 is repeatedly deformed and returns to the original state, so that the pressure-sensitive sensor 10 can function for a long period of time. In the present embodiment, to obtain desired adhesion, the conductive cover 12 is preferably formed of the same elastomer component as the hollow insulation 14 and also contains a conductivity agent mixed to impart a predetermined conductivity. In other words, the conductive cover 12 is preferably formed of the conductive composition (B) containing a styrene-based thermoplastic elastomer (b1) and a conductive agent (b2).

The styrene-based thermoplastic elastomer (b1) (hereinafter, also simply referred to as "component (b1)") constituting the conductive cover 12 can be the same as the styrene-based thermoplastic elastomer (a1) constituting the hollow insulation 14.

The conductivity agent (b2) is to impart conductivity to the styrene-based thermoplastic elastomer (b1). The conductivity agent (b2) is not specifically limited and can be, e.g., carbon black. As the carbon black, it is possible to use furnace black, Ketjenblack, acetylene black, channel black, thermal black and lamp black, etc., which may be used alone or in combination of two or more. Among the carbon blacks, Ketjenblack is preferable. Since excellent conductivity is obtained with a small added amount of Ketjenblack, the amount mixed in the conductive cover 12 can be reduced and it is thereby possible to maintain high flexibility. The particle size is not specifically limited.

The added amount of the conductivity agent (b2) may be appropriately changed according to conductivity required for the conductive cover 12, but is preferably 10 parts by mass-100 parts by mass with respect to 100 parts by mass of the styrene-based thermoplastic elastomer (b1). With not less than 10 parts by mass, the conductive cover 12 can have a desired conductivity. With not more than 100 parts by mass, it is possible to prevent the conductive composition (B) from becoming hard due to mixing the conductivity agent (b2), and also possible to maintain high processability of the conductive composition (B) as well as high flexibility and abrasion resistance of the conductive cover 12.

The conductive composition (B) may also contain a rubber component other than the styrene-based thermoplastic elastomer (b1) or a crystalline resin, etc., and may contain the above-mentioned other additives, in the same manner as the insulating composition (A).

Material for Forming the Outer Layer

The outer layer 16 is required to have enough mechanical characteristics to protect the hollow insulation 14, flexibility, and high adhesion to the hollow insulation 14. A thermoplastic polyurethane (c1) (hereinafter, also simply referred to as "component (c1)") is used in the present embodiment in view of mechanical characteristics and flexibility, but the component (c1) has a low affinity with the styrene-based thermoplastic elastomer (b1) constituting the hollow insulation 14 and adhesion to hollow insulation 14 is thus not sufficient. Thus, in the present embodiment, an acid-modified polymer (c2) modified with an unsaturated carboxylic acid or a derivative thereof (hereinafter, also simply referred to as "component (c2)") is mixed to the component (c1) to improve adhesion.

The thermoplastic polyurethane (c1) is obtained by reacting a diol component and a diisocyanate component and, if required, a chain extender, and contributes to particularly mechanical characteristics and flexibility of the outer layer 16. As the component (c1), it is possible to use polyester-based polyurethane (adipate-based, caprolactone-based and polycarbonate-based), and polyether-based polyurethane. In view of moist-heat resistance, polyether-based polyurethane is preferable.

As the diol component constituting the thermoplastic polyurethane (c1), it is possible to use, e.g., aliphatic diols such as ethylene glycol, 1,2-propylene glycol, 1,3-propylene glycol, 1,4-butanediol, 1,5-pentanediol, 3-methyl-1,5-pentanediol, 1,6-hexanediol, 1,7-heptanediol, 1,8-octanediol, 2-methyl-1,8-octanediol, 1,9-nonanediol and 1,10-decanediol; and alicyclic diols such as cyclohexanedimethanol and cyclohexanediol, etc., which may be used alone or in combination of two or more.

As the diisocyanate component constituting the thermoplastic polyurethane (c1), it is possible to use, e.g., aliphatic or alicyclic diisocyanate such as tetramethylene diisocyanate, pentamethylene diisocyanate, hexamethylene diisocyanate, lysine diisocyanate, cyclohexyl methane diisocyanate, 2,2,4- or 2,4,4-trimethylhexamethylene diisocyanate, isopropylidene bis(4-cyclohexylisocyanate), methylcyclohexane diisocyanate and isophorone diisocyanate; and aromatic diisocyanates such as 2,4- or 2,6-tolylene diisocyanate, diphenylmethane-4,4'-diisocyanate, 3-methyl diphenylmethane-4,4'-diisocyanate, m- or p-phenylene diisocyanate, chlorophenylene-2,4-diisocyanate, naphthalene-1,5-diisocyanate, xylylene diisocyanate and tetramethyl xylylene diisocyanate, etc., which may be used alone or in combination of two or more.

The acid-modified polymer (c2) is a polymer modified with an unsaturated carboxylic acid or a derivative thereof and enhances adhesion of the outer layer 16 to the hollow insulation 14.

As the polymer constituting the acid-modified polymer (c2), it is possible to use crystalline resins such as polypropylene, high-density polyethylene, low-density polyethylene, linear low-density polyethylene, very low-density polyethylene, ethylene-butene-1 copolymer, ethylene-hexene-1 copolymer, ethylene-octene-1 copolymer, polybutene, poly-4-methyl-pentene-1, ethylene-butene-hexene terpolymer, ethylene-vinyl acetate copolymer, ethylene-methyl acrylate copolymer, ethylene-ethyl acrylate copolymer, ethylene-methyl methacrylate copolymer and ethylene-glycidyl methacrylate copolymer, rubbers such as ethylene-propylene-diene copolymer, ethylene-propylene copolymer, ethylene-butene-1-diene copolymer, ethylene-octene-1-diene copolymer, acrylonitrile butadiene rubber and acrylic rubber, and polyolefin-based, styrene-based, polyester-based and polyamide-based thermoplastic elastomers.

As the unsaturated carboxylic acid, it is possible to use acrylic acid, methacrylic acid, maleic acid and fumaric acid, etc. The derivative of the unsaturated carboxylic acid includes metal salts, amides, esters and anhydrides, etc., of the unsaturated carboxylic acids listed above, among which maleic anhydride is preferable.

Among the above-listed components, those having a compression set at 70° C. of not more than 70% are preferable as the acid-modified polymer (c2) in view of reducing the compression set of the outer layer 16 at high temperature and thereby maintaining a high level of high-temperature operability of the pressure-sensitive sensor 10. When such component (c2) is mixed to the thermoplastic polyurethane (c1) having a relatively low compression set, the formed outer layer 16 can have a compression set of not more than 60%. The compression set of the outer layer 16 may be larger than that of the hollow insulation 14 since the volume per unit length of the pressure-sensitive sensor 10 (so-called coating weight) is smaller in the outer layer 16 than in the hollow insulation 14, but high-temperature operability of the pressure-sensitive sensor 10 can be maintained at a higher level when the compression set of the outer layer 16 is not more than 60%. Crystallinity and molecular weight of the acid-modified polymer (c2) are in such a range that the compression set can be not more than 70%.

Although the contents of the thermoplastic polyurethane (c1) and the acid-modified polymer (c2) in the insulating composition (C) constituting the outer layer 16 is not specifically limited, the insulating composition (C) preferably contains 30 parts by mass-99 parts by mass of the component (c1) and 1 part by mass-70 parts by mass of the component (c2) totaling 100 parts by mass. While sufficient adhesion to the hollow insulation is obtained when the mixed amount of the component (c2) is not less than 1 part by mass, it is possible to maintain inherently high mechanical characteristics and flexibility of the component (c1) when not more than 70 parts by mass. In view of obtaining well-balanced, high levels of adhesion, mechanical characteristics and flexibility, it is preferable that the component (c1) be 40 parts by mass-95 parts by mass and the component (c2) be 5 parts by mass-60 parts by mass.

The insulating composition (C) may also contain the above-mentioned other additives in the same manner as the insulating composition (A) and the conductive composition (B).

Method for Manufacturing the Pressure-Sensitive Sensor

Next, a method for manufacturing the pressure-sensitive sensor 10 will be described.

Firstly, the electrode wires 13 each having the conductive cover 12 around the conductor 11 are prepared. To obtain the electrode wire 13, for example, the conductive composition (B) containing the styrene-based thermoplastic elastomer (b1) and the conductive agent (b2) is extruded around the conductor 11 to form the conductive cover 12.

Next, two electrode wires 13 and four long spacers are arranged around one long spacer so that the electrode wires 13 are spaced apart from each other without contact with each other, and a core is formed by twisting the electrode wires 13 and the spacers together. In the core, the two electrode wires 13 face each other and are spirally arranged along the longitudinal direction of the spacer.

Next, the insulating composition (A) containing the styrene-based thermoplastic elastomer (a1) is extruded around the core, thereby forming a substantially cylindrical insulation which covers the core. Then, the insulating composition (C) containing the thermoplastic polyurethane (c1) and the acid-modified polymer (c2) is extruded around the insulation to form the outer layer 16. In the present embodiment, the insulation and the outer layer 16 are formed of the elastomer components and thus do not require crosslinking.

Then, the spacers are pulled out of the insulation, and the hollow insulation 14 is formed continuously in the longitudinal direction. In the hollow insulation 14, the two electrode wires 13 are spirally wound along the inner peripheral surface of the hollow portion 15 throughout the longitudinal length and are arranged facing each other with a distance therebetween and without contact with each other.

The pressure-sensitive sensor 10 in the present embodiment is obtained through the above steps.

Effects of the Present Embodiment

In the pressure-sensitive sensor 10 of the present embodiment, the hollow insulation 14 is formed of the insulating composition (A) containing the styrene-based thermoplastic elastomer (a1) and the outer layer 16 is formed of the insulating composition (C) containing the thermoplastic polyurethane (c1) and the acid-modified polymer (c2). By mixing the component (c2) to the component (c1), it is possible to enhance adhesion of the outer layer 16 to the hollow insulation 14 containing the component (a1). In addition, since the component (a1) does not require crosslinking, the number of steps to manufacture the pressure-sensitive sensor 10 is reduced, allowing for cost reduction. As such, in the present embodiment, the pressure-sensitive sensor 10 with excellent adhesion between the hollow insulation 14 and the outer layer 16 is obtained without the need for crosslinking.

In addition, in the present embodiment, the conductive cover 12 of the electrode wire 13 is formed of the conductive composition (B) containing the styrene-based thermoplastic elastomer (b1) and the conductivity agent (b2). In other words, the conductive cover 12 and the hollow insulation 14 are formed of the same elastomer component. This enhances adhesion between the hollow insulation 14 and the conductive cover 12 and can prevent separation of the electrode wires 13 from the hollow insulation 14 even when the pressure-sensitive sensor 10 is repeatedly operated. Therefore, it is possible to increase long-term reliability of the pressure-sensitive sensor 10.

The insulating composition (C) constituting the outer layer 16 preferably contains 30 parts by mass-99 parts by mass of the thermoplastic polyurethane (c1) and 1 part by mass-70 parts by mass of the acid-modified polymer (c2) totaling 100 parts by mass. As a result, the outer layer 16 can maintain inherently high mechanical characteristics and flexibility of the component (c1) while ensuring adhesion of the outer layer 16 to the hollow insulation 14.

The thermoplastic polyurethane (c1) is preferably a polyether-based polyurethane. As a result, it is possible to enhance moist-heat resistance of the outer layer 16 and thus to enhance high-temperature operability of the pressure-sensitive sensor 10.

The acid-modified polymer (c2) preferably has a compression set at 70° C. of not more than 70% as measured in accordance with JIS K6262. Since this reduces the compression set of the outer layer 16 to not more than 60%, it is possible to reduce the compression set under a high-temperature environment and thereby possible to enhance high-temperature operability and long-term reliability of the pressure-sensitive sensor 10.

The styrene-based thermoplastic elastomer (a1) preferably has a compression set at 70° C. of not more than 30% as measured in accordance with JIS K6262. As a result, the compression set of the hollow insulation 14 under a high-temperature environment can be reduced and it is thereby possible to enhance high-temperature operability and long-term reliability of the pressure-sensitive sensor 10.

The plural electrode wires 13 are preferably spirally arranged inside the hollow portion 15 of the hollow insulation 14 so as to face each other without contact with each other. By spirally winding the plural electrode wires 13 throughout the longitudinal length of the pressure-sensitive sensor 10, the electrode wires 13 can face each other at any longitudinal position of the pressure-sensitive sensor 10. Therefore, even when the number of the electrode wires 13 is reduced to two to increase bendability of the pressure-sensitive sensor 10, it is possible to maintain sensitivity of the pressure-sensitive sensor 10.

Other Embodiments

Although one embodiment of the invention has been specifically described above, the invention is not limited to the above-described embodiment and can be appropriately changed without departing from the gist of the invention.

Although two electrode wires arranged by spirally winding throughout the longitudinal length have been described in the embodiment, the number and arrangement of the electrode wires are not specifically limited. For example, four electrode wires may be provided and linearly arranged so as not to be in contact with each other.

In addition, although the hollow insulation and the outer layer are formed in the separate extrusion processes in the embodiment, the two layers may be simultaneously extruded around a core formed by twisting electrode wires and spacers together.

Examples

Next, the invention will be described in more detail based on Examples. However, the invention is not limited to Examples.

The materials used in Examples are as follows.

The following three types were used as the styrene-based thermoplastic elastomer (a1).

Component (a1-1): styrene-based thermoplastic elastomer ("AR-1050" with compression set of 12% (70° C./24 h), manufactured by Aronkasei Co., Ltd.)

Component (a1-2): styrene-based thermoplastic elastomer ("AR-720" with compression set of 28% (70° C./24 h), manufactured by Aronkasei Co., Ltd.)

Component (a1-3): styrene-based thermoplastic elastomer ("AR-750" with compression set of 31% (70° C./24 h), manufactured by Aronkasei Co., Ltd.)

"LVG9608N" (compression set of 15% at 70° C./24 h) manufactured by Riken Technos Corporation was used as an olefin-based thermoplastic elastomer.

A conductive styrene-based thermoplastic elastomer ("AR-EL2-D30B" manufactured by Aronkasei Co., Ltd., with carbon black contained) was used as the conductive composition (B) containing the styrene-based thermoplastic elastomer (b1) and the conductivity agent (b2).

An ether-based polyurethane ("Elastollan 1180A" with compression set of 45% (70° C./24 h), manufactured by BASF Japan Ltd.) was used as the thermoplastic polyurethane (c1).

The following were used as the acid-modified polymer (c2).

Component (a2-1): ethylene-ethyl acrylate-maleic anhydride terpolymer ("BONDINE LX4110" with compression set of 48% (70° C./24 h), manufactured by Arkema)

Component (a2-2): maleic anhydride-modified SEBS ("Tuftec H1041" with compression set of 70% (70° C./24 h), manufactured by Asahi-Kasei Chemicals Corporation)

Component (a2-3): maleic anhydride-modified ethylene-vinyl acetate: ("MODIC AP A515" with compression set of 81% (70° C./24 h), manufactured by Mitsubishi Chemical Corporation)

Manufacturing of the Pressure-Sensitive Sensor

Firstly, electrode wires were made. In detail, a conductive styrene-based thermoplastic elastomer was extruded around a stranded conductor having an outer diameter of 0.127 mm and composed of seven strands so as to have a wire outer diameter of 0.8 mm, thereby obtaining each electrode wire. Next, two electrode wires and four spacer wires having the same outer diameter were arranged around one spacer wire having the same outer diameter and were twisted together in a state that two spacer wires were circumferentially sandwiched in each gap between the electrode wires, thereby making a core. After that, the insulating composition (A) used for the hollow insulation and the insulating composition (C) used for the outer layer respectively having compositions shown in Table 1 were simultaneously extruded around the core so that the hollow insulation had an outer diameter of 4 mm and the outer layer had a thickness of 0.3 mm. Then, the spacer wires were pulled out, thereby obtaining a pressure-sensitive sensor.

Pressure-sensitive sensors in Examples 1 to 11 and Comparative Examples 1 and 2 were made in the same manner, except that the material for forming the hollow insulation or the material for forming the outer layer was changed as shown in Table 1.

TABLE 1

|  |  |  | \multicolumn{7}{c}{Examples} |
|  |  |  | 1 | 2 | 3 | 4 | 5 | 6 | 7 |
| --- | --- | --- | --- | --- | --- | --- | --- | --- | --- |
| Material for forming hollow insulation (Insulating composition (A)) | Styrene-based thermoplastic elastomer (a1) | Component (a1-1) (Compression set: 12%) | 100 | — | — | 100 | 100 | 100 | 100 |
|  |  | Component (a1-2) (Compression set: 28%) | — | 100 |  |  |  |  |  |
|  |  | Component (a1-3) (Compression set: 31%) |  |  | 100 |  |  |  |  |
|  | Olefin-based thermoplastic elastomer | Olefin-based component (Compression set: 15%) |  |  |  |  |  |  |  |
| Material for forming conductive cover (Conductive composition (B)) |  | Styrene-based thermoplastic elastomer (b1) + conductivity agent (b2) |  |  |  |  | 100 |  |  |
| Material for forming outer layer (Insulating composition (C)) |  | Thermoplastic polyurethane (c1) (Compression set: 45%) | 95 | 95 | 95 | 95 | 95 | 90 | 85 |
|  | Acid-modified polymer (c2) | Acid-modified polymer (c2-1) (Compression set: 48%) | 5 | 5 | 5 | — | — | — | — |
|  |  | Acid-modified polymer (c2-2) (Compression set: 70%) | — | — | — | 5 | — | 10 | 15 |
|  |  | Acid-modified polymer (c2-3) (Compression set: 81%) | — | — | — | — | 5 | — | — |
| Evaluation | Adhesion between hollow insulation and electrode wire |  | ○ | ○ | ○ | ○ | ○ | ○ | ○ |
|  | Adhesion between hollow insulation and outer layer |  | ○ | ○ | ○ | ○ | ○ | ○ | ○ |
|  | Compression set (%) of outer layer |  | 46 | 46 | 46 | 60 | 65 | 62 | 65 |
|  | Compression resistance in high-temperature environment Temperature (° C.) at which sample passed the test |  | 90 | 80 | 70 | 80 | 70 | 80 | 70 |

|  |  |  | \multicolumn{4}{c}{Examples} | \multicolumn{2}{c}{Comparative Examples} |
|  |  |  | 8 | 9 | 10 | 11 | 1 | 2 |
| --- | --- | --- | --- | --- | --- | --- | --- | --- |
| Material for forming hollow insulation (Insulating composition (A)) | Styrene-based thermoplastic elastomer (a1) | Component (a1-1) (Compression set: 12%) | 100 | 100 | 100 | 100 | — | 100 |
|  |  | Component (a1-2) (Compression set: 28%) |  |  |  |  |  |  |
|  |  | Component (a1-3) (Compression set: 31%) |  |  |  |  |  |  |
|  | Olefin-based thermoplastic elastomer | Olefin-based component (Compression set: 15%) |  |  |  |  | 100 |  |
| Material for forming conductive cover (Conductive composition (B)) |  | Styrene-based thermoplastic elastomer (b1) + conductivity agent (b2) |  |  |  | 100 |  |  |
| Material for forming outer layer (Insulating composition (C)) |  | Thermoplastic polyurethane (c1) (Compression set: 45%) | 60 | 40 | 60 | 40 | 95 | 100 |
|  | Acid-modified polymer (c2) | Acid-modified polymer (c2-1) (Compression set: 48%) | 40 | 60 | — | — | 5 | — |
|  |  | Acid-modified polymer (c2-2) (Compression set: 70%) | — | — | 40 | 60 | — | — |
|  |  | Acid-modified polymer (c2-3) (Compression set: 81%) | — | — | — | — | — | — |
| Evaluation | Adhesion between hollow insulation and electrode wire |  | ○ | ○ | ○ | ○ | X | ○ |
|  | Adhesion between hollow insulation and outer layer |  | ○ | ○ | ○ | ○ | X | X |
|  | Compression set (%) of outer layer |  | 47 | 47 | 69 | 70 | 46 | 45 |
|  | Compression resistance in high-temperature environment Temperature (° C.) at which sample passed the test |  | 90 | 90 | 70 | 60 | 90 | 90 |

Evaluation Methods

The obtained pressure-sensitive sensors were evaluated by the following methods.

Adhesion Between the Hollow Insulation and the Electrode Wire

Figure 3:
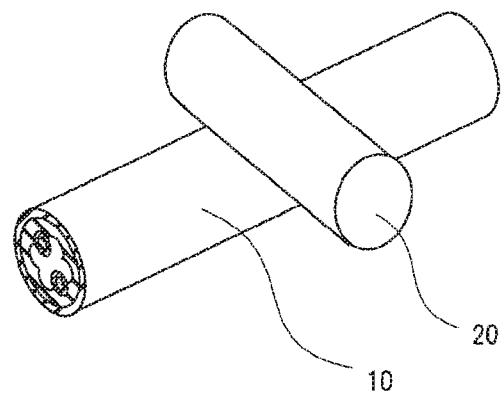
FIG. 3 is an explanatory schematic diagram illustrating a test method conducted on the pressure-sensitive sensors in Examples to evaluate adhesion of electrode wires to a hollow insulation and compression resistance in a high-temperature environment.

To evaluate adhesion between the hollow insulation and the electrode wire, a 4 mm-diameter stainless-steel round bar 20 was placed at a right angle with respect to the pressure-sensitive sensor 10 as shown in FIG. 3, and a test was conducted in which the pressure-sensitive sensor 10 in contact with the round bar 20 was repeatedly compressed. In detail, the pressure-sensitive sensor 10 was repeatedly compressed with a stroke length of 2 mm at a frequency of 1 Hz for 10000 cycles of compression and was then disassembled after the test, and separation of the electrode wires from the hollow insulation at the compressed portion was observed.

In these Examples, it was judged as Pass and indicated as "○" when there was no separation, and it was judged as Fail and indicated as "x" when separation was observed.

Adhesion Between the Hollow Insulation and the Outer Layer

Figure 4:
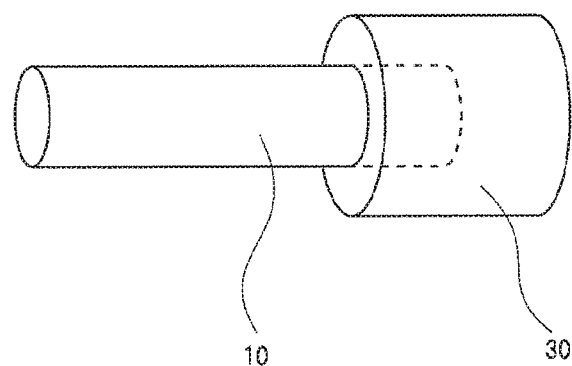
FIG. 4 is a schematic diagram illustrating an end of the pressure-sensitive sensor sealed with a molded resin.

For adhesion between the hollow insulation and the outer layer, samples as shown in FIG. 4 were made and evaluated. In detail, the hollow portion at one end of the pressure-sensitive sensor 10 was sealed with a UV curing resin, and a molded body 30 was formed by injection molding of a polyamide resin ("Reny 1002F", glass fiber 30%, manufactured by Mitsubishi Engineering-Plastics Corporation). The molded body 30 had a diameter of 15 mm and a length of 20 mm, and the insertion length of the pressure-sensitive sensor 10 was 15 mm. In these Examples, it was judged as Pass and indicated as "○" when the outer appearance after the molding process was good, and it was judged as Fail and indicated as "x" when the polyamide resin entered between the hollow insulation and the outer layer and the outer appearance was poor.

Compression Set of the Outer Layer

Sheet samples were separately made using the same compositions as for the outer layers of the pressure-sensitive sensors, and the compression set of the sheet samples was measured in accordance with JIS K6262. In these Examples, the test temperature was 70° C. and the test duration was 24 hours. The lower compression set values indicate that the state after restoration is closer to the original shape.

Compression Resistance in High-Temperature Environment

The 4 mm-diameter stainless-steel round bar 20 was placed at a right angle with respect to the pressure-sensitive sensor 10 as shown in FIG. 3, the pressure-sensitive sensor 10 in contact with the round bar 20 was compressed by 2 mm and was left in a constant-temperature oven at 90° C. for 24 hours while keeping this compressed state. After 24 hours, it was cooled to room temperature and the round bar 20 was removed from the pressure-sensitive sensor 10, and electrical conduction between the electrode wires was measured by an ohmmeter. It was judged as Pass when there was no electrical conduction, and it was judged as Fail when the electrode wires were in contact with each other and electricity was conducted. In case that the samples failed the test, the test was repeated until the samples passed the test while lowering the test temperature by 10° C. each time. Passing the test at higher temperature indicates that compression resistance in a high-temperature environment is better.

Evaluation Results

The evaluation results are shown in Table 1. As shown in Table 1, in Examples 1 to 11, it was possible to obtain high adhesion between the hollow insulation and the outer layer without performing crosslinking. In addition, since both the conductive cover and the hollow insulation were formed of the styrene-based thermoplastic elastomer, high adhesion was obtained.

In Examples 1 to 3, it was confirmed that the compression resistance of the pressure-sensitive sensor in a high-temperature environment can be increased when the compression set of the elastomer component contained in the hollow insulation is lower.

In Examples 1, 4 and 5, it was confirmed that the compression set of the outer layer can be smaller when the compression set of the acid-modified polymer (c2) contained in the outer layer is smaller, which leads to improvement in compression resistance of the pressure-sensitive sensor in a high-temperature environment.

In Examples 4, 6 and 7, it was confirmed that the compression set of the outer layer can be smaller when the outer layer contains a smaller amount of the acid-modified polymer (c2) and a higher percentage of the thermoplastic polyurethane (c1), which leads to improvement in compression resistance of the pressure-sensitive sensor in a high-temperature environment. Although it is acceptable as long as the mixed amount of the component (c2) is 1 part by mass-70 parts by mass with respect to 100 parts by mass of the total of the component (c1) and the component (c2), it was confirmed that the mixed amount of the component (c2) is preferably 1 part by mass-10 parts by mass in view of enhancing compression resistance of the pressure-sensitive sensor while maintaining adhesion between the hollow insulation and the outer layer.

A ratio of the acid-modified polymer (c2) relative to the thermoplastic polyurethane (c1) may be increased, as shown in Examples 8 to 11. In Examples 8 and 9, it was confirmed that when the component (c2-1) is used as the acid-modified polymer, the evaluation result equivalent to that for Example 1 is obtained even when the mixed amount of the component (c2-1) is 40 parts by mass-60 parts by mass with respect to 100 parts by mass of the total of the component (c1) and the component (c2-1). In Examples 10 and 11, it was confirmed that when the component (c2-2) is used as the acid-modified polymer, the pressure-sensitive sensor can have compression resistance while maintaining adhesion between the hollow insulation and the outer layer even when the mixed amount of the component (c2-2) is 40 parts by mass-60 parts by mass with respect to 100 parts by mass of the total of the component (c1) and the component (c2-2).

On the other hand, in Comparative Example 1 in which the hollow insulation was not formed of the styrene-based thermoplastic elastomer (a1) but formed of the olefin-based thermoplastic elastomer, the hollow insulation could not have adhesion to the outer layer containing the thermoplastic polyurethane (c1), and furthermore, could not have sufficient adhesion to the electrode wires.

In addition, in Comparative Example 2 in which the acid-modified polymer (c2) was not mixed to the outer layer, the outer layer could not have sufficient adhesion to the hollow insulation containing the styrene-based thermoplastic elastomer (a1).

As described above, by forming the hollow insulation using the insulating composition (A) containing the styrene-based thermoplastic elastomer (a1) and at the same time forming the outer layer using the insulating composition (C) containing the thermoplastic polyurethane (c1) and the acid-modified polymer (c2), a desired adhesion is obtained between the hollow insulation and the outer layer in the pressure-sensitive sensor. In addition, by forming the conductor cover of the electrode wire using the conductive composition (B) containing the styrene-based thermoplastic elastomer (b1), a desired adhesion is obtained between the hollow insulation and the electrode wires. Furthermore, since the component (a1) does not require crosslinking, it is possible to reduce the number of steps by eliminating the crosslinking step from the manufacturing process of the pressure-sensitive sensor. Therefore, according to the invention, a pressure-sensitive sensor excellent in adhesion between a hollow insulation and an outer layer and thus excellent in long-term reliability is obtained without the need for crosslinking.

Preferred Embodiments of the Invention

Preferred embodiments of the invention will be as set forth in [1] to [10] below.

[1] A pressure-sensitive sensor, comprising:

a long hollow insulation that is elastically deformable and comprises a hollow portion extending continuously in a longitudinal direction;

a plurality of electrode wires that are provided along the inner peripheral surface of the hollow portion throughout the longitudinal length and are arranged facing each other with a distance therebetween so as to come into contact with each other when bent with elastic deformation of the hollow insulation, each electrode wire being formed by providing a conductive cover around a conductor; and an outer layer formed to cover an outer surface of the hollow insulation, wherein the hollow insulation comprises an insulating composition (A) comprising a styrene-based thermoplastic elastomer (a1), and the outer layer comprises an insulating composition (C) comprising a thermoplastic polyurethane (c1) and an acid-modified polymer (c2) that is modified with an unsaturated carboxylic acid or a derivative thereof.

[2] The pressure-sensitive sensor defined by [1], wherein the insulating composition (C) constituting the outer layer comprises not less than 30 parts by mass and not more than 99 parts by mass of the thermoplastic polyurethane (c1) and not less than 1 part by mass and not more than 70 parts by mass of the acid-modified polymer (c2) totaling 100 parts by mass.

[3] The pressure-sensitive sensor defined by [2], wherein the insulating composition (C) constituting the outer layer comprises not less than 40 parts by mass and not more than 95 parts by mass of the thermoplastic polyurethane (c1) and not less than 5 parts by mass and not more than 60 parts by mass of the acid-modified polymer (c2) totaling 100 parts by mass.

[4] The pressure-sensitive sensor defined by any one of [1] to [3], wherein the thermoplastic polyurethane (c1) comprises a polyether-based polyurethane.

[5] The pressure-sensitive sensor defined by any one of [1] to [4], wherein the acid-modified polymer (c2) has a compression set at 70° C. of not more than 70% as measured in accordance with JIS K6262.

[6] The pressure-sensitive sensor defined by any one of [1] to [5], wherein the outer layer has a compression set at 70° C. of not more than 60% as measured in accordance with JIS K6262.

[7] The pressure-sensitive sensor defined by any one of [1] to [6], wherein the styrene-based thermoplastic elastomer (a1) has a compression set at 70° C. of not more than 30% as measured in accordance with JIS K6262.

[8] The pressure-sensitive sensor defined by any one of [1] to [7], wherein the styrene-based thermoplastic elastomer (a1) includes no double bonds in the molecular chain.

[9] The pressure-sensitive sensor defined by [8], wherein the styrene-based thermoplastic elastomer (a1) comprises at least one of styrene-ethylene-butylene-styrene block copolymer, styrene-ethylene-propylene-styrene block copolymer and styrene-ethylene-ethylene-propylene-styrene block copolymer.

[10] The pressure-sensitive sensor defined by any one of [1] to [9], wherein the plurality of electrode wires are spirally arranged inside the hollow portion so as to face each other without contact with each other.

What is claimed is:

1. A pressure-sensitive sensor, comprising:
    a long hollow insulation that is elastically deformable and comprises a hollow portion extending continuously in a longitudinal direction;
    a plurality of electrode wires that are provided along an inner peripheral surface of the hollow portion throughout a longitudinal length and are arranged facing each other with a distance therebetween so as to come into contact with each other when bent with elastic deformation of the hollow insulation, each electrode wire being formed by providing a conductive cover around a conductor; and
    an outer layer formed to cover an outer surface of the hollow insulation,
    wherein the hollow insulation comprises an insulating composition (A) comprising a styrene-based thermoplastic elastomer (a1), and
    wherein the outer layer comprises an insulating composition (C) comprising a thermoplastic polyurethane (c1) and an acid-modified polymer (c2) that is modified with an unsaturated carboxylic acid or a derivative thereof.

2. The pressure-sensitive sensor according to claim 1, wherein the insulating composition (C) constituting the outer layer comprises not less than 30 parts by mass and not more than 99 parts by mass of the thermoplastic polyurethane (c1) and not less than 1 part by mass and not more than 70 parts by mass of the acid-modified polymer (c2) totaling 100 parts by mass.

3. The pressure-sensitive sensor according to claim 2, wherein the thermoplastic polyurethane (c1) comprises a polyether-based polyurethane.

4. The pressure-sensitive sensor according to claim 2, wherein the acid-modified polymer (c2) has a compression set at 70° C. of not more than 70% as measured in accordance with JIS K6262.

5. The pressure-sensitive sensor according to claim 2, wherein the outer layer has a compression set at 70° C. of not more than 60% as measured in accordance with JIS K6262.

6. The pressure-sensitive sensor according to claim 2, wherein the styrene-based thermoplastic elastomer (a1) has a compression set at 70° C. of not more than 30% as measured in accordance with JIS K6262.

7. The pressure-sensitive sensor according to claim 2, wherein the plurality of electrode wires are spirally arranged inside the hollow portion so as to face each other without contact with each other.

8. The pressure-sensitive sensor according to claim 1, wherein the thermoplastic polyurethane (c1) comprises a polyether-based polyurethane.

9. The pressure-sensitive sensor according to claim 8, wherein the acid-modified polymer (c2) has a compression set at 70° C. of not more than 70% as measured in accordance with JIS K6262.

10. The pressure-sensitive sensor according to claim 8, wherein the outer layer has a compression set at 70° C. of not more than 60% as measured in accordance with JIS K6262.

11. The pressure-sensitive sensor according to claim 8, wherein the styrene-based thermoplastic elastomer (a1) has a compression set at 70° C. of not more than 30% as measured in accordance with JIS K6262.

12. The pressure-sensitive sensor according to claim 8, wherein the plurality of electrode wires are spirally arranged inside the hollow portion so as to face each other without contact with each other.

13. The pressure-sensitive sensor according to claim 1, wherein the acid-modified polymer (c2) has a compression set at 70° C. of not more than 70% as measured in accordance with JIS K6262.

14. The pressure-sensitive sensor according to claim 13, wherein the outer layer has a compression set at 70° C. of not more than 60% as measured in accordance with JIS K6262.

15. The pressure-sensitive sensor according to claim 13, wherein the styrene-based thermoplastic elastomer (a1) has a compression set at 70° C. of not more than 30% as measured in accordance with JIS K6262.

16. The pressure-sensitive sensor according to claim 13, wherein the plurality of electrode wires are spirally arranged inside the hollow portion so as to face each other without contact with each other.

17. The pressure-sensitive sensor according to claim 1, wherein the outer layer has a compression set at 70° C. of not more than 60% as measured in accordance with JIS K6262.

18. The pressure-sensitive sensor according to claim 17, wherein the styrene-based thermoplastic elastomer (a1) has a compression set at 70° C. of not more than 30% as measured in accordance with JIS K6262.

19. The pressure-sensitive sensor according to claim 17, wherein the plurality of electrode wires are spirally arranged inside the hollow portion so as to face each other without contact with each other.

20. The pressure-sensitive sensor according to claim 1, wherein the styrene-based thermoplastic elastomer (a1) has a compression set at 70° C. of not more than 30% as measured in accordance with JIS K6262.

21. The pressure-sensitive sensor according to claim 20, wherein the plurality of electrode wires are spirally arranged inside the hollow portion so as to face each other without contact with each other.

22. The pressure-sensitive sensor according to claim 1, wherein the plurality of electrode wires are spirally arranged inside the hollow portion so as to face each other without contact with each other.

* * * * *